(12) United States Patent
Ishii et al.

(10) Patent No.: US 7,903,182 B2
(45) Date of Patent: Mar. 8, 2011

(54) DISPLAY DEVICE

(75) Inventors: Katsuhiko Ishii, Chousei (JP); Risa Takahashi, Mobara (JP); Yasushi Sano, Yokohama (JP)

(73) Assignee: Hitachi Displays, Ltd., Chiba (JP)

( * ) Notice: Subject to any disclaimer, the term of this patent is extended or adjusted under 35 U.S.C. 154(b) by 57 days.

(21) Appl. No.: 12/232,173

(22) Filed: Sep. 11, 2008

(65) Prior Publication Data
US 2009/0066862 A1    Mar. 12, 2009

(30) Foreign Application Priority Data

Sep. 12, 2007  (JP) ................. 2007-236102

(51) Int. Cl.
*G02F 1/1335*   (2006.01)
*G02F 1/1345*   (2006.01)
(52) U.S. Cl. .......................................... 349/12; 349/150
(58) Field of Classification Search .................... 349/12, 349/150
See application file for complete search history.

(56) References Cited

U.S. PATENT DOCUMENTS

| | | | |
|---|---|---|---|
| 6,204,896 B1 | 3/2001 | Matsuhira et al. | |
| 6,424,394 B1 | 7/2002 | Morii | |
| 6,444,407 B1* | 9/2002 | Day et al. | 430/321 |
| 6,879,365 B2* | 4/2005 | Hedrick | 349/137 |
| 6,933,991 B2* | 8/2005 | Sanelle et al. | 349/96 |
| 7,081,940 B2 | 7/2006 | Suzuki | |
| 2003/0160740 A1* | 8/2003 | Hedrick | 345/32 |
| 2005/0249932 A1* | 11/2005 | Wang et al. | 428/219 |
| 2006/0158579 A1* | 7/2006 | Hasegawa | 349/58 |
| 2006/0225831 A1* | 10/2006 | Lei et al. | 156/229 |
| 2007/0046874 A1 | 3/2007 | Adachi et al. | |
| 2008/0220184 A1* | 9/2008 | Sakurai et al. | 428/1.51 |
| 2009/0097115 A1* | 4/2009 | Miyazaki et al. | 359/463 |
| 2009/0231508 A1* | 9/2009 | Sato et al. | 349/58 |
| 2009/0237602 A1* | 9/2009 | Kubota et al. | 349/122 |

FOREIGN PATENT DOCUMENTS

| | | |
|---|---|---|
| JP | 7-13144 | 6/1993 |
| JP | 10-170890 | 8/1997 |
| JP | 11-174435 | 12/1997 |
| JP | 2000-275621 | 3/1999 |
| JP | 11174435 A * | 7/1999 |
| JP | 2003-262858 | 3/2002 |
| JP | 2005055641 A * | 3/2005 |
| JP | 2007-178758 | 12/2005 |
| JP | 2006-221187 | 4/2006 |

* cited by examiner

*Primary Examiner* — K. Cyrus Kianni
(74) *Attorney, Agent, or Firm* — Stites & Harbison, PLLC; Juan Carlos A. Marquez, Esq.

(57) ABSTRACT

The present invention is directed to providing a technology for display devices where a transparent cover is pasted on a display panel according to which inconsistencies resulting from expansion of the polarizing plate in the vicinity of an end portion caused by moisture can be prevented, and the adhesive can be prevented from sagging when the display panel and the transparent cover are pasted together. A display device according to the invention is provided with: a liquid crystal display panel having a first substrate, a second substrate provided on the viewer side of the above described first substrate and a liquid crystal layer sandwiched between the above described first substrate and the above described second substrate; and a transparent cover pasted on the surface of the above described liquid crystal display panel on the above described viewer side using an adhesive. The above described liquid crystal display panel has a polarizing plate between the above described second substrate and the above described transparent cover. The above described adhesive covers the entirety of a side of the above described polarizing plate, and the form of the outer periphery of the above described adhesive in a plane is uneven.

2 Claims, 7 Drawing Sheets

*Prior Art*

Fig. 12 *Prior Art*

DISPLAY DEVICE

The present application claims priority from Japanese application JP2007-236102 filed on Sep. 12, 2007, the content of which is hereby incorporated by reference into this application.

BACKGROUND OF THE INVENTION (1) Field of the Invention

The present invention relates to a display device where a transparent cover is pasted on the surface of a display panel using an adhesive.

(2) Related Art Statement

Liquid crystal display devices having a liquid crystal display panel, for example, are known as display devices. In many cases, a transparent cover, such as of an acryl resin, is provided on such a liquid crystal display panel on the viewer side (front side). This transparent cover works as a protective cover plate. However, the transparent cover is provided at a predetermined distance from the liquid crystal display panel, and therefore, there is an air layer between the transparent cover and the liquid crystal display panel. Therefore, there is unnecessary interface reflection, due to the difference in the index of refraction in the interface with the air layer, which is a factor affecting lowering of contrast in the display.

Figure 11:
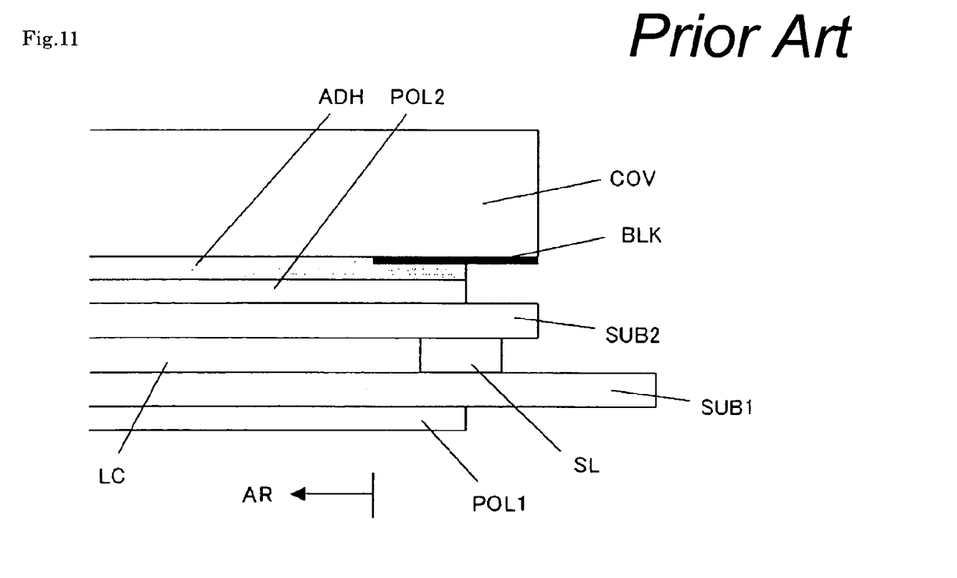
FIG. 11 is a cross sectional diagram illustrating the configuration of a conventional liquid crystal display device.

In order to solve this, a technology according to which a transparent cover is pasted on the surface of a liquid crystal display panel using an adhesive has been proposed. FIG. 11 is a cross sectional diagram showing the configuration of a conventional liquid crystal display device.

The liquid crystal display panel shown in FIG. 11 has a configuration where a first substrate SUB1 and a second substrate SUB2 are pasted together via a sealing material SL, and a liquid crystal layer LC is sandwiched between the first substrate SUB1 and the second substrate SUB2. In addition, a polarizing plate POL1 and a polarizing plate POL2 are provided on the first substrate SUB1 on the side opposite to the liquid crystal layer LC and on the second substrate SUB2 on the side opposite to the liquid crystal layer LC, respectively.

A transparent cover COV is pasted on the surface of the liquid crystal display panel on the viewer side using an adhesive ADH. The transparent cover COV is provided with a light blocking film BLK on the outside of the display region AR of the liquid crystal display panel. In addition, in the case where an adhesive ADH of which the index of refraction is close to that of the transparent cover COV is used, there is no air layer, and therefore, unnecessary reflection in the interface resulting from the index of refraction can be prevented, and the contrast in the display can be increased.

In addition to the conventional configuration shown in FIG. 11, prior art relating to the present invention are disclosed in the following Patent Documents 1 and 2, for example.

(Patent Document 1) Japanese Unexamined Patent Publication 2007-178758

(Patent Document 2) Japanese Unexamined Patent Publication 2006-221187

SUMMARY OF THE INVENTION

Figure 12:
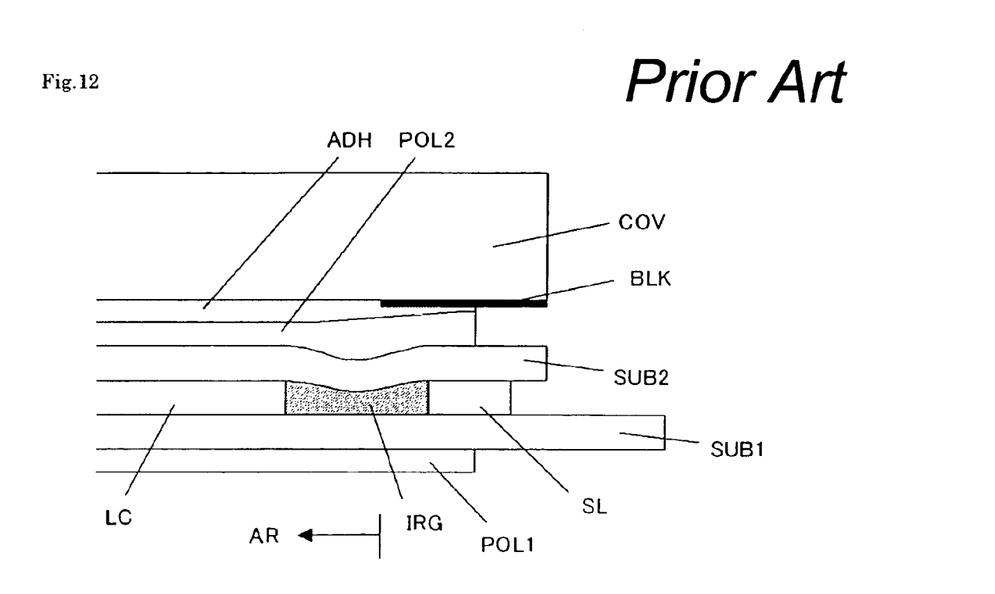
FIG. 12 is a cross sectional diagram illustrating a problem with the conventional liquid crystal display device shown in FIG. 11.

FIG. 12 is a cross sectional diagram illustrating a problem with the conventional liquid crystal display device shown in FIG. 11. In the case of the conventional configuration shown in FIG. 11, the end portion of the adhesive ADH and the end portion of the polarizing plate TOL2 approximately coincide, and therefore, the side of the polarizing plate POL 2 is exposed. As a result, as shown in FIG. 12, moisture enters from the side of the polarizing plate POL2, and a problem arises, such that the polarizing plate POL2 expands in the vicinity of the end portion.

In general, the transparent cover COV is thicker than the second substrate SUB2. Accordingly, the transparent cover COV barely deforms under the stress caused by the expansion of the polarizing plate POL2 in the vicinity of the end portion, and the second substrate SUB2 deforms in such a manner as to bulge out toward the first substrate SUB1 side in the vicinity of the end portion of the second substrate SUB2. This deformation becomes severe as the adhesive ADH becomes thinner. As a result of the deformation, there is an inconsistent gap region IRG where the thickness of the liquid crystal layer LC changes. When this inconsistent gap region IRG reaches the inside of the display region AR, a problem arises, such that yellowish, frame-like inconsistency, for example, appears in the display.

Patent Documents 1 and 2 do not describe any such problem of the polarizing plate expanding in the vicinity of the end portion, but disclose a configuration where the adhesive protrudes from the polarizing plate so as to cover the side of the polarizing plate.

In the case of the configuration shown in Patent Documents 1 and 2, when the transparent cover and the liquid crystal display panel shift in position at the time of pasting, a problem arises, such that the adhesive protrudes and sags from the substrate on the upper side (corresponding to the second substrate SUB2 in FIG. 11).

Protection of the drive circuit in the case where the drive circuit is mounted on the first substrate SUB1 is not taken into consideration for the configuration shown in FIG. 11 and Patent Documents 1 and 2. In the case where the drive circuit mounted on the display panel is covered with a transparent cover, there is a gap between the transparent cover and the drive circuit, and therefore, there is a possibility of the transparent cover cracking when the region on which the drive circuit is mounted or the vicinity thereof is pressed.

In addition, there is also a problem with the configuration shown in FIG. 11 and Patent Documents 1 and 2, such that it is difficult to sufficiently harden the adhesive ADH in the region where the transparent cover COV overlaps with the light blocking film BLK in the case where an adhesive which can be hardened through irradiation with light, for example an ultraviolet ray curing type adhesive, or an adhesive having the properties of both thermosetting type and ultraviolet ray curing type adhesives is used as the adhesive ADH.

In addition, these problems are not limited to the liquid crystal display devices using a liquid crystal display panel, and could occur in display devices using a display panel of another type.

The above described and other problems will become clearer from the descriptions throughout the entirety of the present specification and the drawings.

Means for Solving Problem

In an example of the display device according to the present invention, the entirety of the sides of the polarizing plate is coated with an adhesive for pasting the transparent cover to the display panel, for example. At this time, the form of the outer periphery of the adhesive in a plane is uneven.

In another example of the display device according to the present invention, the drive circuit mounted on the display panel is coated with a transparent cover, for example. At this time, the adhesive is also between the transparent cover and the drive circuit.

In still another example of the display device according to the present invention, an opening is created in the light blocking film of the transparent cover in the case where an adhesive which can be hardened through irradiation with light is used as the adhesive for pasting the transparent cover to the display panel, for example.

The following configuration can be provided for the present invention, for example.

(1) A display device has:
a liquid crystal display panel having a first substrate, a second substrate provided on the viewer side of the above described first substrate and a liquid crystal layer sandwiched between the above described first substrate and the above described second substrate; and
a transparent cover pasted on the surface of the above described liquid crystal display panel on the above described viewer side using an adhesive, and
the above described liquid crystal display panel has a polarizing plate between the above described second substrate and the above described transparent cover,
the above described adhesive covers the entirety of a side of the above described polarizing plate, and
the form of the outer periphery of the above described adhesive in a plane is uneven.

(2) In the same structure as in (1), the thickness of the above described adhesive between the above described transparent cover and the above described polarizing plate may be in a range from 30 μm to 200 μm, and
the amount of the above described adhesive protruding from around the above described polarizing plate may be 0.1 mm or more even where it protrudes the least.

(3) In the same structure as in (1), the thickness of the above described adhesive between the above described transparent cover and the above described polarizing plate may be in a range from 30 μm to 100 μm, and
the amount of the above described adhesive protruding from around the above described polarizing plate may be 0.1 mm or more even where it protrudes the least.

(4) In the same structure as in any of (1) to (3), the above described liquid crystal display panel may have a sealing material for pasting the above described first substrate and the above described second substrate together, which is provided around the display region, and
an end portion of the above described polarizing plate may overlap with the above described sealing material.

(5) In the same structure as in any of (1) to (3), the above described liquid crystal display panel may have a sealing material for pasting the above described first substrate and the above described second substrate together, which is provided around the display region, and
an end portion of the above described polarizing plate may be located on the side closer to the above described display region than the above described sealing material.

(6) In the same structure as in any of (1) to (5), a drive circuit may be mounted in a region of the above described first substrate which protrudes from the above described second substrate,
the above described transparent cover may cover the above described drive circuit, and
the above described adhesive may be provided between the above described transparent cover and the above described drive circuit.

(7) In the same structure as in any of (1) to (6), the above described transparent cover may have a light blocking film in the region where the above described drive circuit is mounted,
the above described adhesive may be an adhesive which can be cured through irradiation with light, and
the above described light blocking film may have an opening in a portion of the region where the above described drive circuit is mounted.

(8) In the same structure as in any of (1) to (7), the above described transparent cover may function as a touch panel.

(9) A display device has:
a liquid crystal display panel having a first substrate, a second substrate provided on the viewer side of the above described first substrate and a liquid crystal layer sandwiched between the above described first substrate and the above described second substrate; and
a transparent cover pasted on the surface of the above described liquid crystal display panel on the above described viewer side using an adhesive, and
the above described liquid crystal display panel has a polarizing plate between the above described second substrate and the above described transparent cover,
the above described adhesive covers the entirety of a side of the above described polarizing plate,
a drive circuit is mounted in a region of the above described first substrate which protrudes from the above described second substrate,
the above described transparent cover covers the above described drive circuit, and
the above described adhesive is provided between the above described transparent cover and the above described drive circuit.

(10) In the same structure as in (9), the above described transparent cover may have a light blocking film in the region where the above described drive circuit is mounted,
the above described adhesive may be an adhesive which can be cured through irradiation with light, and
the above described light blocking film may have an opening in a portion of the region where the above described drive circuit is mounted.

(11) In the same structure as in (9) or (10), the form of the outer periphery of the above described adhesive in a plane may be uneven.

(12) In the same structure as in any of (9) to (11), the thickness of the above described adhesive between the above described transparent cover and the above described polarizing plate may be in a range from 30 μm to 200 μm, and
the amount of the above described adhesive protruding from around the above described polarizing plate may be 0.1 mm or more even where it protrudes the least.

(13) In the same structure as in any of (9) to (11), the thickness of the above described adhesive between the above described transparent cover and the above described polarizing plate may be in a range from 30 μm to 100 μm, and
the amount of the above described adhesive protruding from around the above described polarizing plate may be 0.1 mm or more even where it protrudes the least.

(14) In the same structure as in any of (9) to (13), the above described liquid crystal display panel may have a sealing material for pasting the above described first substrate and the above described second substrate together, which is provided around the display region, and
an end portion of the above described polarizing plate may overlap with the above described sealing material.

(15) In the same structure as in any of (9) to (13), the above described liquid crystal display panel may have a sealing material for pasting the above described first substrate and the above described second substrate together, which is provided around the display region, and an end portion of the above described polarizing plate may be located on the side closer to the above described display region than the above described sealing material.

(16) In the same structure as in any of (9) to (15), the above described transparent cover may function as a touch panel.

(17) A display device has:
  a display panel; and
  a transparent cover pasted on the surface of the above described display panel on the viewer side using an adhesive, and
  the above described transparent cover has a light blocking film,
  the above described adhesive is an adhesive which can be hardened through irradiation with light,
  the above described light blocking film of the above described transparent cover has a window from which a display region of the above described display panel is exposed and an opening provided in another location from the above described window, and
  the above described adhesive at least partially overlaps with the above described opening of the above described light blocking film.

(18) In the same structure as in (17), a drive circuit may be mounted along at least one side of the above described display panel,
  the above described transparent cover may cover the above described drive circuit,
  the above described adhesive may also be between the above described transparent cover and the above described drive circuit, and
  the above described light blocking film along the above described side where the above described drive circuit may be mounted from among the above described light blocking film of the above described transparent cover has the above described opening.

(19) In the same structure as in (17) or (18), the above described display panel may be a liquid crystal display panel.

(20) In the same structure as in any of (17) to (19), the above described transparent cover may function as a touch panel.

Here, the above described configurations are mere examples, and appropriate modifications of the present invention are possible within such a scope as not to deviate from the technical idea. In addition, examples of the configuration of the present invention other than those described above will be clarified in the description throughout the entirety of the present specification and the drawings.

Effects of the Invention

Typical effects of the present invention are as follows.

According to the present invention, the entirety of the sides of a polarizing plate is covered with the adhesive for pasting the transparent cover to the display panel, and therefore, inconsistency in the display resulting from expansion of the polarizing plate in the vicinity of an end portion caused by moisture can be prevented. Furthermore, the form of the outer periphery of the adhesive for pasting the transparent cover to the display panel in a plane is uneven, and thus, the adhesive can be prevented from sagging when the display panel and the transparent cover are pasted together.

In addition, according to the present invention, an adhesive intervenes between the transparent cover and the drive circuit in the case where the drive circuit mounted on the display panel is coated with a transparent cover, and thus, the transparent cover can be prevented from cracking when pressed.

In addition, according to the present invention, an opening is created in the light blocking film of the transparent cover in the case where an adhesive which can be hardened through irradiation with light is used as the adhesive for pasting the transparent cover to the display panel, and therefore, the adhesive can be sufficiently hardened.

Other effects of the present invention will become clearer from the description throughout the entire specification.

EXPLANATION OF SYMBOLS

SUB1, SUB2 . . . substrates
SL . . . sealing material
LC . . . liquid crystal layer
POL1, POL2 . . . polarizing plate
COV . . . transparent cover
BLK . . . light blocking film
WD . . . window
OP . . . opening
ADH . . . adhesive
AR . . . display region
IRG . . . inconsistent gap region
d . . . distance
DRV . . . drive circuit
RES . . . terminal protecting resin
FPC . . . flexible wire substrate
BL . . . backlight

DETAILED DESCRIPTION OF THE INVENTION

Best Mode for Carrying Out the Invention

The embodiments of the present invention are described in reference to the drawings. Here, the same symbols are attached to components which are the same or similar in the respective diagrams and embodiments, and descriptions which are the same are omitted.

First Embodiment

Figure 1:
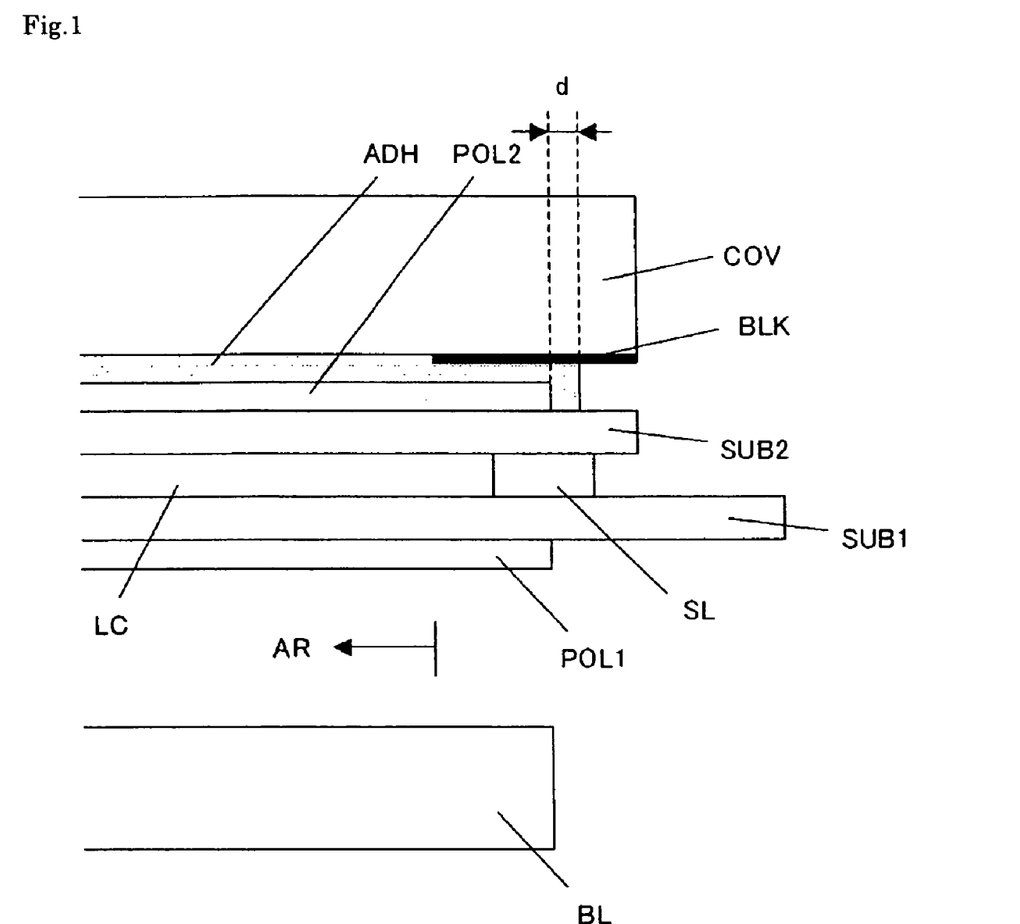
FIG. 1 is a cross sectional diagram showing the display device according to the first embodiment of the present invention.
Figure 2:
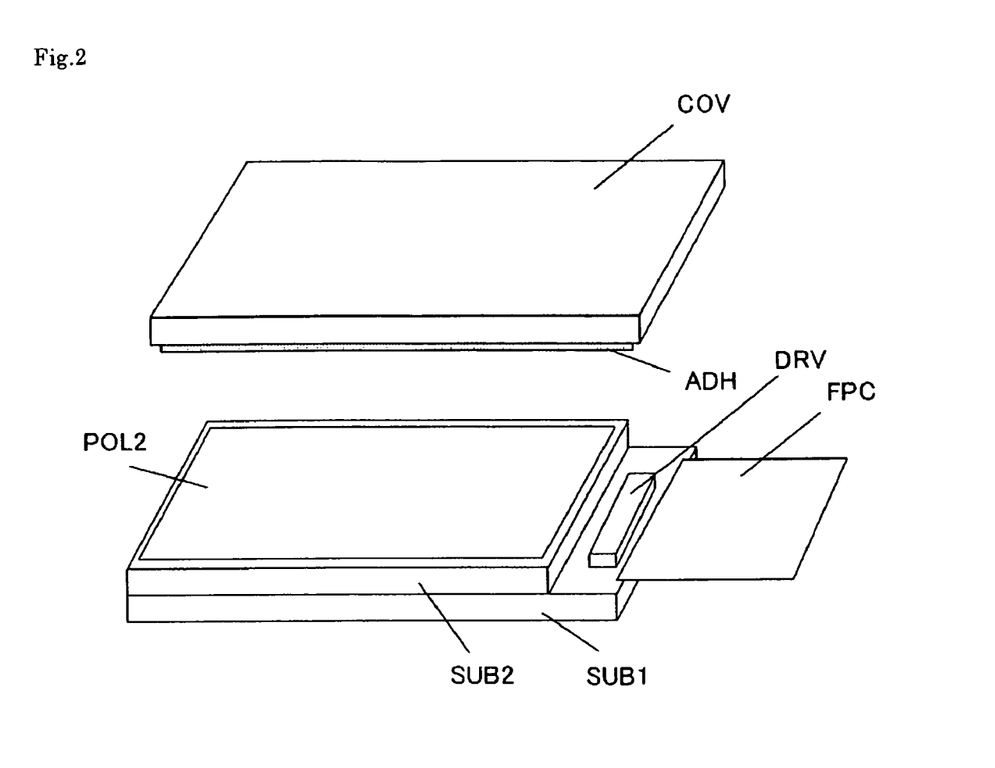
FIG. 2 is a perspective diagram showing illustrating the manner in which the display panel and the transparent cover are pasted together according to one example of the present invention.
Figure 3:
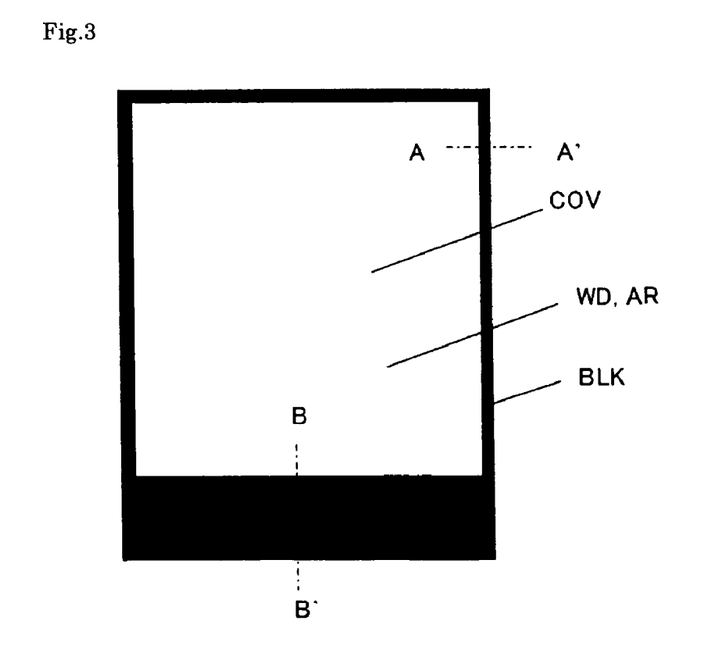
FIG. 3 is a plan diagram showing the transparent cover according to one embodiment of the present invention.

FIG. 1 is a cross sectional diagram showing the display device according to the first embodiment of the present invention. FIG. 2 is a perspective diagram showing the manner in which the display panel and the transparent cover are pasted together according to an example of the present invention. FIG. 3 is a plan diagram showing the transparent cover according to one example of the present invention.

Here, a case where a liquid crystal display panel is used as the display panel is described as an example. As shown in FIG. 1, the liquid crystal display panel has an insulating, transparent first substrate SUB1 and second substrate SUB2 formed of glass, for example. In addition, the first substrate SUB1 and the second substrate SUB2 are pasted together using a sealing material SL. A liquid crystal layer LC is sandwiched between the first substrate SUB1 and the second substrate SUB2. A sealing material SL is formed in the peripheral portion outside the display region AR of the liquid crystal display panel so as to surround the liquid crystal layer LC. In FIG. 1, the second substrate SUB2 side is the viewer side (front side). In the present embodiment, the first substrate SUB1 and the second substrate SUB2 both have a thickness of 0.3 mm and the liquid crystal layer LC has a thickness of 4 µm, but the invention is not limited to this.

A number of pixels are aligned in a matrix in the display region AR of the liquid crystal display panel. A number of scanning signal lines, a number of video signal lines which cross the number of scanning signal lines, a number of switching elements, for example thin film transistors, and a number of pixel electrodes are formed on the surface of the first substrate SUB1 on the liquid crystal layer LC side. In addition, one or more facing electrodes are formed on the surface of the first substrate SUB1 or the second substrate SUB2 on the liquid crystal layer LC side. The liquid crystal molecules in the liquid crystal layer LC are controlled by the electrical field generated by the difference in potential between the pixel electrodes and the facing electrodes, so that an image is displayed.

In addition, the liquid crystal display panel has a polarizing plate POLL which is provided on the surface of the first substrate SUB1 on the side opposite to the liquid crystal layer LC, and a polarizing plate POL2 which is provided on the surface of the second substrate SUB2 on the side opposite to the liquid crystal layer LC. In the present embodiment, the thickness of the polarizing plate POL1 and the thickness of the polarizing plate POL2 are both 150 µm, but the invention is not limited to this.

A backlight BL having a light source is provided on the rear surface side of the liquid crystal display panel.

A transparent cover COV is pasted on the surface of the liquid crystal display panel on the viewer side using an adhesive ADH. As shown in FIG. 2, the adhesive is applied on the rear surface side of the transparent cover COV, for example, which is pasted to the liquid crystal display panel in a vacuum, and after that, the adhesive ADH is hardened using light, heat or both light and heat. It is desirable for the thickness of the adhesive ADH to be in a range from 30 µm to 200 µm in the portion between the transparent cover COV and the polarizing plate POL, and it is more desirable for it to be in a range from 30 µm to 100 µm. In the present embodiment, for example, the thickness is 50 µm. An adhesive ADH of which the index of refraction is only slightly different from that of the transparent cover COV (it is desirable for the difference in the index of refraction to be 0.2 or less), for example an acryl resin or an epoxy resin, can be used, and thus, it is possible to reduce unnecessary reflection in the interface.

The transparent cover COV is formed of a transparent material, such as glass or an acryl resin, and works as a protective cover panel. It is desirable for the thickness to be 0.5 mm to 2.5 mm, and in the present embodiment, the thickness is 1.8 mm. As shown in FIGS. 1 and 3, the transparent cover COV has a light blocking film BLK. The light blocking film BLK of the transparent cover COV has a window WD from which the display region AR is exposed. Accordingly, the light blocking film BLK is formed as a frame surrounding the display region AR on the outside.

As shown in FIG. 2, the liquid crystal display panel has a region where the first substrate SUB1 protrudes from the second substrate SUB2 on at least one side, and a drive circuit DRV formed of a semiconductor chip or the like may be mounted in this protruding region. In addition, a terminal for connection to the outside may be formed in the protruding portion, so that a flexible wiring board FPC may be connected to this terminal. In addition, the transparent cover COV may cover the region of the first substrate SUB1 which protrudes from the second substrate SUB2. In this case, as shown in FIG. 3, it is desirable for the width of the light blocking film BLK of the transparent cover COV on the side corresponding to the protruding region to be greater than the width of the light blocking film on the other sides.

FIG. 1 is a cross sectional diagram along line A-A' in FIG. 3. Here, though the first substrate SUB1 protrudes from the second substrate SUB2 in FIG. 1, the invention is not limited to this, and the location of the end portions of the first substrate SUB1 and the second substrate SUB2 may approximately coincide on the sides other than the side on which a drive circuit DRV or flexible wiring board FPC are mounted. This is the same in the other embodiments.

In the present embodiment, as shown in FIG. 1, an end portion of the adhesive ADH protrudes from the end portion of the polarizing plate POL2 by a distance D. This adhesive ADH protrudes on all four sides around the circumference of the polarizing plate POL2. As a result, the entirety of the sides of the polarizing plate POL2 can be coated with the adhesive ADH, and therefore, inconsistency in the display resulting from expansion of the polarizing plate POL2 in the vicinity of the end portions caused by moisture as shown in FIG. 12 can be prevented.

When the adhesive ADH protrudes in this manner, however, there is a possibility that a problem may arise, such that the adhesive ADH sags from the second substrate SUB2 when the transparent cover COV and the liquid crystal display panel shift in position when pasted together.

Figure 4:
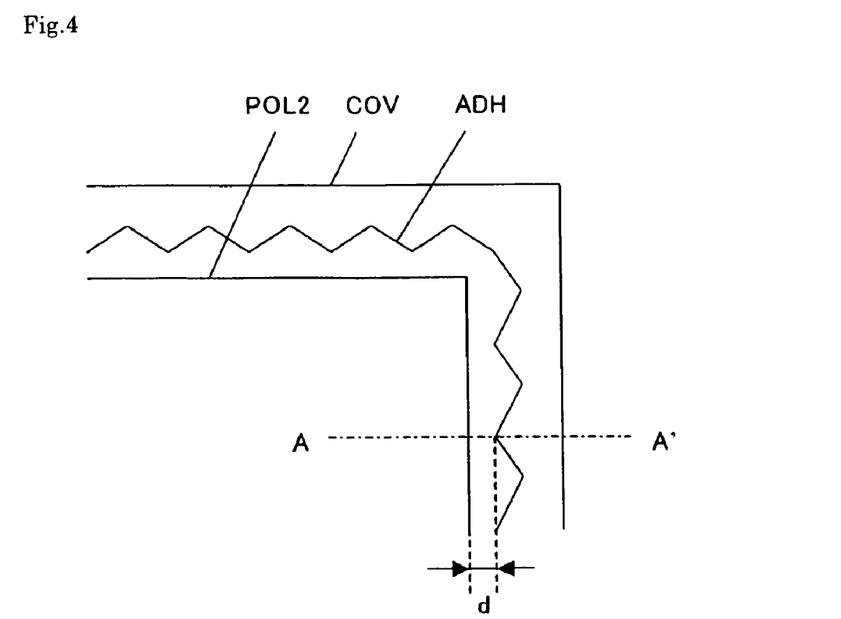
FIG. 4 is a plan diagram showing an example of the form of the adhesive in a plane.
Figure 5:
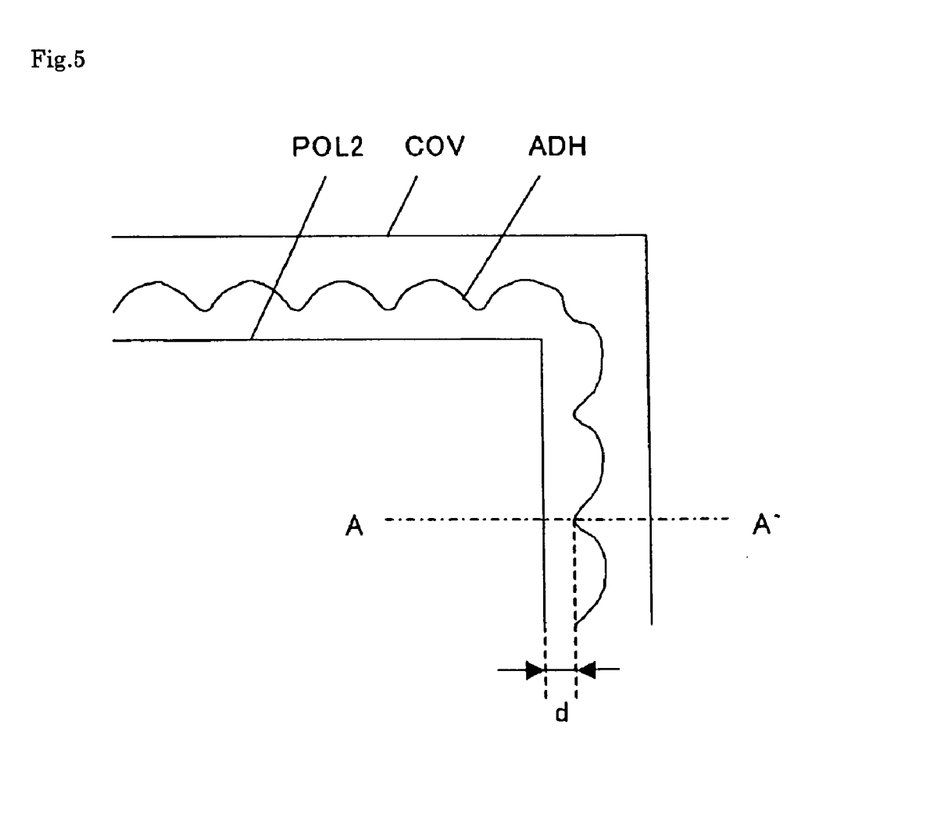
FIG. 5 is a plan diagram showing another example of the form of the adhesive in a plane.
Figure 6:
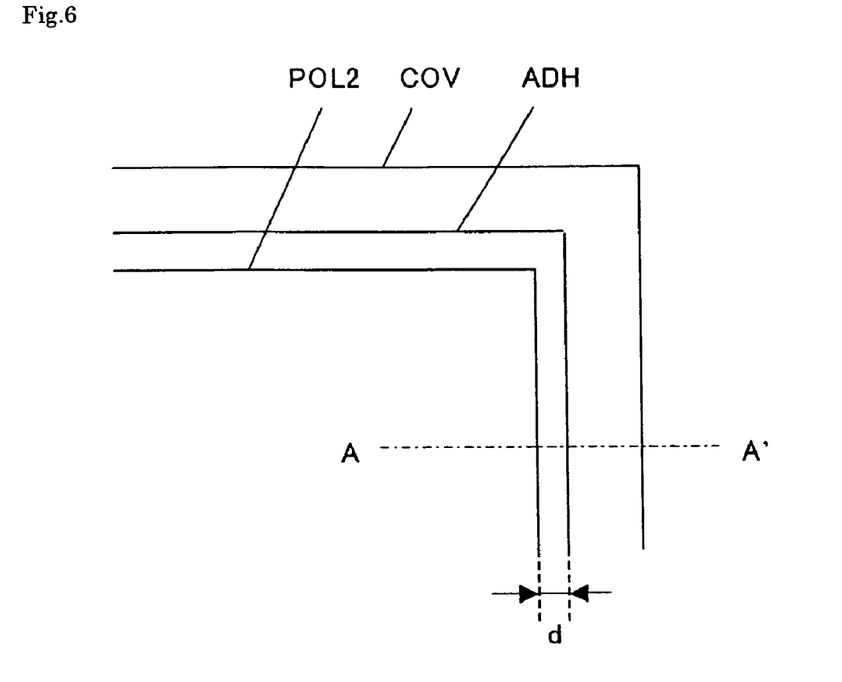
FIG. 6 is a plan diagram showing still another example of the form of the adhesive in a plane.

Therefore, the form of the outer periphery of the adhesive ADH in a plane is uneven, and thus, the adhesive ADH can be prevented from sagging. FIGS. 4, 5 and 6 are plan diagrams illustrating examples of the form of the adhesive in a plane. FIGS. 4, 5 and 6 are enlargements of the upper right portion in FIG. 3. Accordingly, the cross sectional diagram along line A-A' in FIGS. 4, 5 and 6 is FIG. 1.

As shown in FIGS. 4 and 5, the form of the outer periphery of the adhesive ADH in a plane is uneven, and thus, extra adhesive ADH can be absorbed in the recesses when the transparent cover and the liquid crystal display panel are pasted together, and thus, the adhesive ADH can be prevented from sagging, as compared to the case where the form of the adhesive is not uneven, as in FIG. 6. Here, from the point of view of preventing inconsistency in the display resulting from expansion of the polarizing plate POL2 in the vicinity of an end portion caused by moisture, it is desirable for the distance d by which the adhesive ADH protrudes from the polarizing plate POL2 to be 0.1 mm or more, even where it protrudes the least.

Second Embodiment

Figure 7:
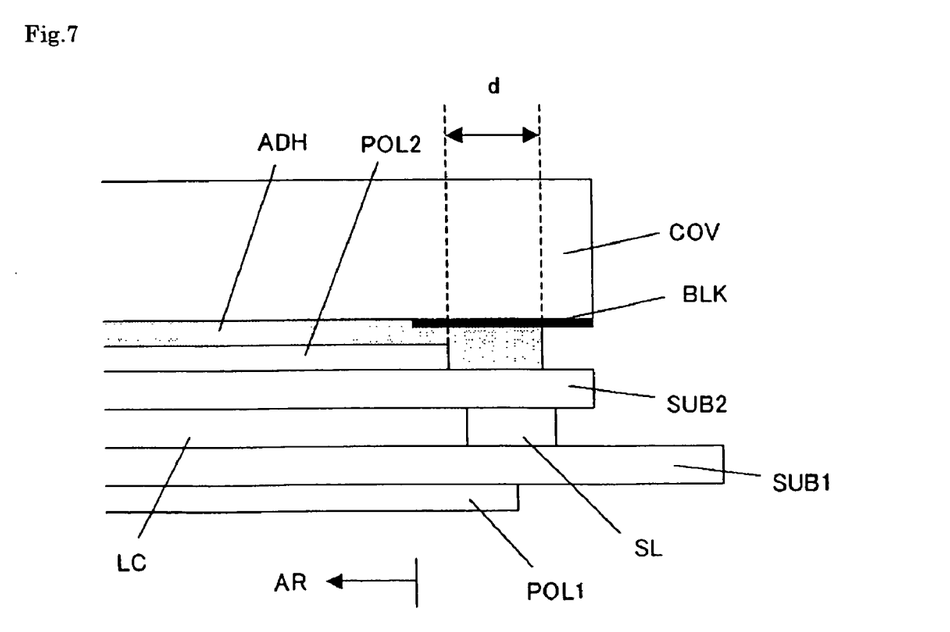
FIG. 7 is a cross sectional diagram illustrating the display device according to the second embodiment of the present invention.

FIG. 7 is a cross sectional diagram showing the display device according to the second embodiment of the present invention. FIG. 7 is a cross sectional diagram showing a portion corresponding to FIG. 1. The basic configuration in the second embodiment is the same as in the first embodiment. The difference from the first embodiment is the location of the end portion of the polarizing plate POL2.

A case where the end portion of the polarizing plate POL2 is in such a location as to overlap with the sealing material SL is shown as an example of the above described embodiment in FIG. 1. However, there is a problem with this case, such that the adhesive ADH cannot protrude by much of a distance d. Thus, in the second embodiment, which is the present embodiment, an end portion of the polarizing plate POL2 is located on the side closer to the display region AR than the sealing material SL provided around the display region AR.

As a result, it becomes easy to secure a large distance d. Accordingly, even adhesive ADH of which the form is uneven, as shown in FIGS. 4 and 5, can be prevented from sagging, and can prevent moisture from entering without fail.

In addition, in the present embodiment, as shown in FIG. 6, it is possible to adopt a configuration where the form of the adhesive ADH in a plane is not uneven. According to the present embodiment, a sufficient distance between the end portion of the adhesive ADH and the end portion of the second substrate SUB2 (or end portion of the transparent cover COV) can be secured, even when the distance d is fairly great. Accordingly, it becomes possible to prevent the problem with the adhesive ADH sags from the second substrate SUB as a result of a large margin, even when the transparent cover COV and the liquid crystal display panel shift in position when pasted together.

Third Embodiment

Figure 8:
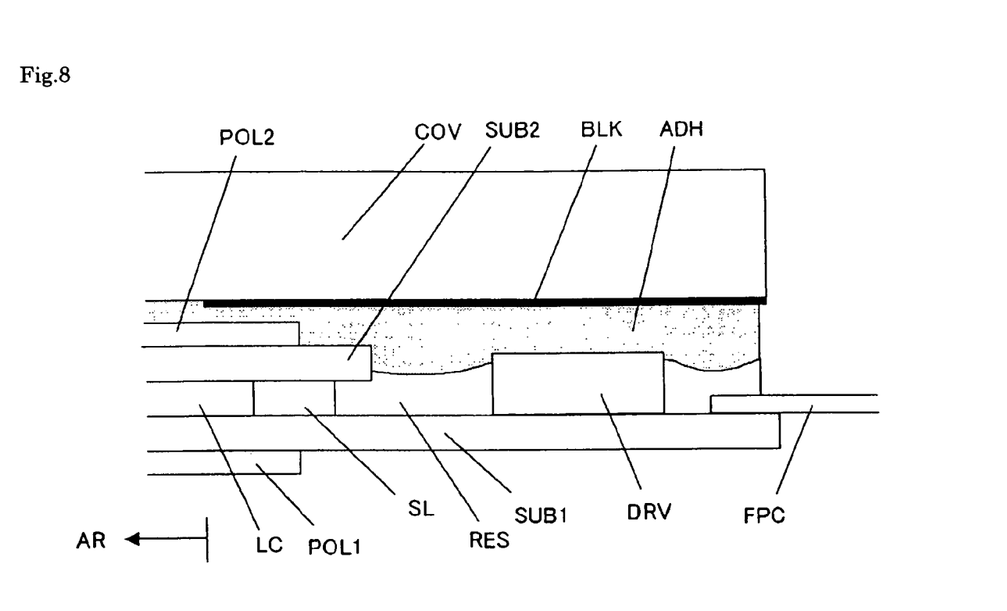
FIG. 8 is a cross sectional diagram illustrating the display device according to the third embodiment of the present invention.

FIG. 8 is a cross sectional diagram showing the display device according to the third embodiment of the present invention. FIG. 8 is a cross sectional diagram along line B-B' in FIG. 3. The basic configuration in the third embodiment is the same as in the first and second embodiments, and therefore, mainly portions which are different in the configuration are described.

In the present embodiment, a drive circuit DRV is mounted in the region of the first substrate SUB1 which protrudes from the second substrate SUB2, as described in the first embodiment. In addition, the transparent cover COV is provided so as to cover the drive circuit DRV. In the case where the transparent cover COV is provided so as to cover the drive circuit DRV and there is a space between the two, however, there is a possibility that a problem may arise, such that the transparent cover COV cracks when pressed.

Therefore, in the present embodiment, the adhesive ADH is also provided between the transparent cover COV and the drive circuit DRV, as shown in FIG. 8. As a result, the problem with the transparent cover COV cracking when pressed can be prevented.

Here, the adhesive ADH may be provided around the periphery of the drive circuit DRV. In addition, a terminal protecting resin RES may be provided around the periphery of the drive circuit DRV.

Figure 9:
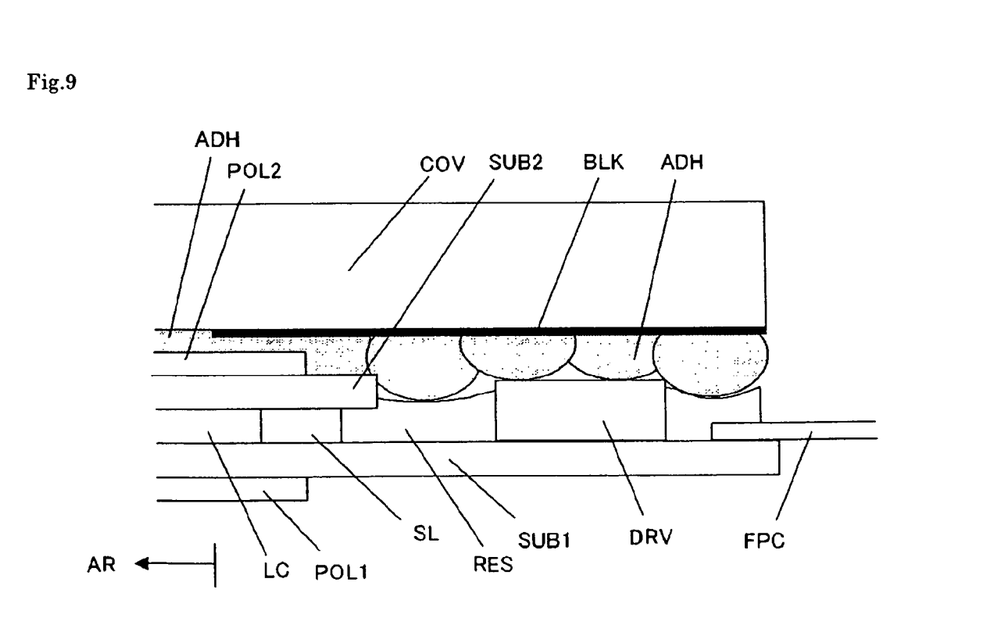
FIG. 9 is a cross sectional diagram illustrating the display device according to a modification of the third embodiment of the present invention.

FIG. 9 is a cross sectional diagram showing the display device according to a modification of the third embodiment of the present invention. FIG. 9 is a cross sectional diagram showing a portion corresponding to FIG. 8. As shown in FIG. 9, the adhesive ADH may be provided as dots, lines or a lattice in the peripheral region of the drive circuit DRV in such a state that the surface is uneven. In this case, though there may be a small space, the problem with the transparent cover COV cracking when pressed can be prevented, even in the case of the configuration shown in FIG. 9.

Fourth Embodiment

Figure 10:
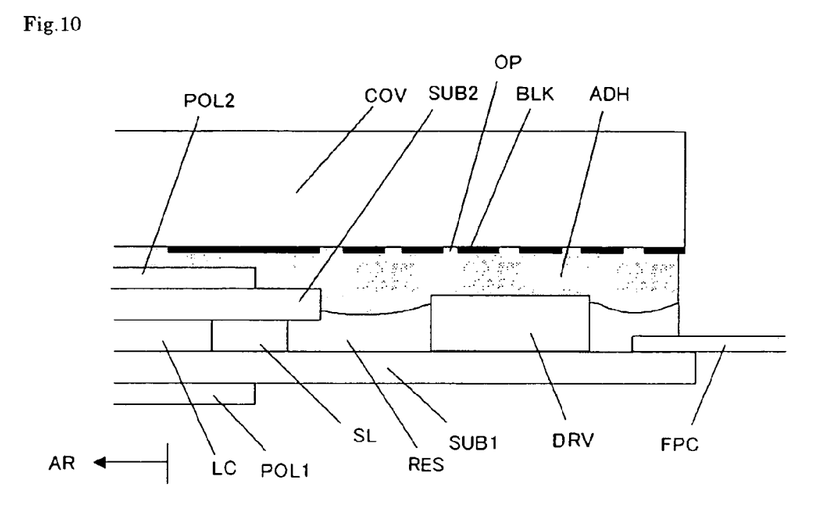
FIG. 10 is a cross sectional diagram showing the display device according to the fourth embodiment of the present invention.

FIG. 10 is a cross sectional diagram showing the display device according to the fourth embodiment of the present invention. FIG. 10 is a cross sectional diagram along line B-B' in FIG. 3. The basic configuration in the fourth embodiment is the same as in the first to third embodiments, and therefore, mainly portions having a different configuration are described.

In the case where an adhesive which can be hardened through irradiation with light, for example an ultraviolet ray curing type adhesive, or an adhesive having the properties of both thermosetting type and ultraviolet ray curing type adhesives is used as the adhesive ADH, a problem arises, such that it is difficult to harden the adhesive ADH sufficiently in the region where the transparent cover COV overlaps with the light blocking film BLK.

Therefore, in the present embodiment, as shown in FIG. 10, an opening OP is provided in another location from the window WD in the light blocking film BLK of the transparent cover COV. As a result, it becomes possible to irradiate the adhesive ADH in the portion where it overlaps with the opening OP and its periphery with light, and thus, it become possible to sufficiently harden the adhesive ADH.

Here, in FIG. 10, the problem is significant in the portion where the width of the light blocking film BLK is great in FIG. 3, and therefore, an opening OP is provided in the light blocking film BLK on the bottom, but the invention is not limited to this, and openings OP may be provided in the light blocking film BLK having a small width, for example in the top, the right and the left in FIG. 3.

The opening OP may be in any pattern, for example dots, lines or a lattice.

Fifth Embodiment

In the first to fourth embodiments, a touch panel may be used as the transparent cover COV.

Though first to fifth embodiments of the present invention are described in the above, the configurations described in the respective embodiments are merely examples, and appropriate modifications of the present invention are possible within such a scope rot to deviate from the technical idea. In addition, the configurations described in the respective embodiments may be combined for use, unless they are incompatible.

In addition, though a liquid crystal display device using a liquid crystal display panel is described as an example in the first to fifth embodiments, the present invention may be applied to display devices using other types of display panels.

The invention claimed is:
1. A display device, comprising:
a liquid crystal display panel having a first substrate, a second substrate provided on a viewer side of said first substrate, and a liquid crystal layer sandwiched between said first substrate and said second substrate; and a transparent cover pasted on a surface of said liquid crystal display panel on said viewer side using an adhesive, characterized in that
said liquid crystal display panel has a polarizing plate between said second substrate and said transparent cover,
said adhesive covers the entirety of a side of said polarizing plate,
a form of an outer periphery of said adhesive in a plane is uneven,
a drive circuit is mounted in a region of said first substrate which protrudes from said second substrate,
said transparent cover covers said drive circuit, and
said adhesive is provided between said transparent cover and said drive circuit.

2. A display device, comprising:
a liquid crystal display panel having a first substrate, a second substrate provided on a viewer side of said first substrate, and a liquid crystal layer sandwiched between said first substrate and said second substrate; and
a transparent cover pasted on a surface of said liquid crystal display panel on said viewer side using an adhesive, characterized in that
said liquid crystal display panel has a polarizing plate between said second substrate and said transparent cover,
said adhesive covers the entirety of a side of said polarizing plate,
a form of an outer periphery of said adhesive in a plane is uneven,
said transparent cover has a light blocking film in a region where a drive circuit is mounted, said adhesive is an adhesive which can be cured through irradiation with light, and
said light blocking film has an opening in a portion of the region where said drive circuit is mounted.

* * * * *